United States Patent
Digh et al.

(10) Patent No.: US 7,918,192 B1
(45) Date of Patent: Apr. 5, 2011

(54) MULTI-PURPOSE PET UTILITY VEST

(76) Inventors: Mary Riley Digh, Matthews, NC (US); Jessica Lauren Riley, Astoria, NY (US)

( * ) Notice: Subject to any disclaimer, the term of this patent is extended or adjusted under 35 U.S.C. 154(b) by 123 days.

(21) Appl. No.: 12/319,761

(22) Filed: Jan. 12, 2009

Related U.S. Application Data

(60) Provisional application No. 61/020,233, filed on Jan. 10, 2008.

(51) Int. Cl.
*A01K 13/00* (2006.01)
(52) U.S. Cl. ........................................ 119/850
(58) Field of Classification Search .................. 119/792, 119/907, 770, 850; 2/94, 102
See application file for complete search history.

(56) References Cited

U.S. PATENT DOCUMENTS

| | | | |
|---|---|---|---|
| 5,184,762 A | 2/1993 | Nevitt | |
| D363,572 S | 10/1995 | Obenchain | |
| 5,560,321 A * | 10/1996 | Hess | 119/858 |
| 5,632,235 A * | 5/1997 | Larsen et al. | 119/856 |
| D379,687 S | 6/1997 | Curtis | |
| 5,644,902 A | 7/1997 | Kemp | |
| D383,255 S | 9/1997 | Caditz | |
| D384,780 S | 10/1997 | McLaughlin | |
| 5,887,772 A | 3/1999 | Dooley | |
| 5,996,537 A | 12/1999 | Caditz | |
| D429,390 S | 8/2000 | Grady | |
| D429,391 S | 8/2000 | Grady | |
| 6,314,917 B1 | 11/2001 | Ryan | |
| D457,988 S | 5/2002 | Kerrigan | |
| D459,842 S | 7/2002 | Kaplan | |
| 6,571,745 B2 * | 6/2003 | Kerrigan | 119/858 |
| D480,843 S | 10/2003 | Sullivan | |
| 7,131,399 B2 * | 11/2006 | Blommel | 119/712 |
| 7,410,197 B2 | 8/2008 | Edwards | |
| 2005/0072376 A1 * | 4/2005 | Kerrigan | 119/850 |
| 2006/0090711 A1 * | 5/2006 | Richards | 119/850 |
| 2007/0267531 A1 * | 11/2007 | Petersen | 242/588.6 |
| 2008/0006223 A1 * | 1/2008 | Sugalski | 119/795 |

* cited by examiner

*Primary Examiner* — Timothy D Collins
*Assistant Examiner* — Joshua Huson
(74) *Attorney, Agent, or Firm* — Schwartz Law Firm, P.C.

(57) ABSTRACT

A multi-purpose utility vest for a pet incorporates a body portion, and a pocket assembly carried by the body portion. The pocket assembly includes overlying outside and inside pocket layers. The outside and inside pocket layers are formed together along a dividing line to define first and second isolated utility compartments having respective first and second access openings for receiving and storing articles therein. A bag-dispensing grommet is attached to the outside pocket layer, and defines a small hole communicating with the first utility compartment for dispensing disposable plastic bags stored in the first utility compartment.

19 Claims, 6 Drawing Sheets

MULTI-PURPOSE PET UTILITY VEST

TECHNICAL FIELD AND BACKGROUND

The present disclosure relates broadly to a multi-purpose pet utility vest. In exemplary embodiments discussed herein, the pet utility vest may dispense plastic waste bags for collection of pet waste, and may incorporate at least one utility pocket assembly for carry the pet waste until it can be disposed of properly. The exemplary utility vest may also be used for enhancing visibility of the pet during the day and night, and for covering the pet in cold and inclement weather conditions.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

According to one exemplary embodiment, the disclosure comprises a multi-purpose utility vest for a pet. The vest incorporates a body portion, and a pocket assembly carried by the body portion and comprising overlying outside and inside pocket layers. The outside and inside pocket layers are formed together along a dividing line to define first and second isolated utility compartments having respective first and second access openings for receiving and storing articles therein. A bag-dispensing grommet is attached to the outside pocket layer, and defines a small hole communicating with the first utility compartment for dispensing disposable plastic bags stored in the first utility compartment.

As used herein, the term "body portion" is broadly defined to mean any structure or element, including a fabric covering, garment, harness, strap assembly, or the like, designed for use on or with a pet. The term "vest" is not intended to connote any particular pet garment, covering, harness, or strap assembly, but instead is used broadly herein to cover that defined in the appended claims and any and all equivalents thereof.

According to another exemplary embodiment, the bag-dispensing grommet has a radially-slit flexible center defining pliant (resilient) fingers adapted to frictionally engage plastic bags pulled through the grommet from inside the first utility compartment.

According to another exemplary embodiment, means are provided for selectively closing the access opening to the first utility compartment.

According to another exemplary embodiment, the means for closing comprises a zipper fastener. Alternative exemplary closing means for the first utility compartment may comprise complementary hook and loop fasteners, snaps, buttons, or the like.

According to another exemplary embodiment, means are provided for selectively closing the access opening to the second utility compartment.

According to another exemplary embodiment, the means for closing comprises a zipper fastener. Alternative exemplary closing means for the second utility compartment may comprise complementary hook and loop fasteners, snaps, buttons, or the like.

According to another exemplary embodiment, the body portion comprises a one-piece fabric covering.

According to another exemplary embodiment, the fabric covering defines a zippered leash passage.

According to another exemplary embodiment, a second pocket assembly is carried by the body portion, and comprises overlying outside and inside pocket layers defining a third utility compartment, and an access opening to the third utility compartment for receiving and storing articles therein.

According to another exemplary embodiment, the outside pocket layer of the second pocket assembly comprises a mesh see-through fabric.

According to another exemplary embodiment, means are provided for selectively closing the access opening to the third utility compartment.

According to another exemplary embodiment, the means for closing the third utility compartment comprises a zipper fastener. Alternative means for closing the third utility compartment may comprise complementary hook and loop fasteners, snaps, buttons, or the like.

According to another exemplary embodiment, a plurality of reflective strips are applied to the body portion.

According to another exemplary embodiment, first and second adjustable torso straps are adapted for detachably securing the body portion to the pet.

According to another exemplary embodiment, the torso straps comprise complementary male and female fittings.

According to another exemplary embodiment, the body portion comprises cooperating neck straps adapted for securing the vest around a neck of the pet.

According to another exemplary embodiment, the neck straps comprise complementary hook and loop fasteners.

According to another exemplary embodiment, a plurality of detachably-connected plastic bags are stored in roll-form in the first utility compartment.

In yet another exemplary embodiment, the disclosure may comprise a multi-purpose utility vest for a pet including a body portion and pocket assembly. The pocket assembly is carried by the body portion, and comprises an outside pocket layer and an inside pocket layer. The outside and inside pocket layers cooperate to define a utility compartment, and an access opening to the utility compartment for receiving and storing articles therein. A bag-dispensing grommet is attached to the outside pocket layer, and defines a small hole communicating with the utility compartment for dispensing disposable plastic bags stored in the utility compartment.

BRIEF DESCRIPTION OF THE DRAWINGS

The description of exemplary embodiments proceeds in conjunction with the following drawings, in which.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterite) is not intended to indicate or imply that the invention has been previously reduced to practice or that any testing has been performed.

Figure 1:
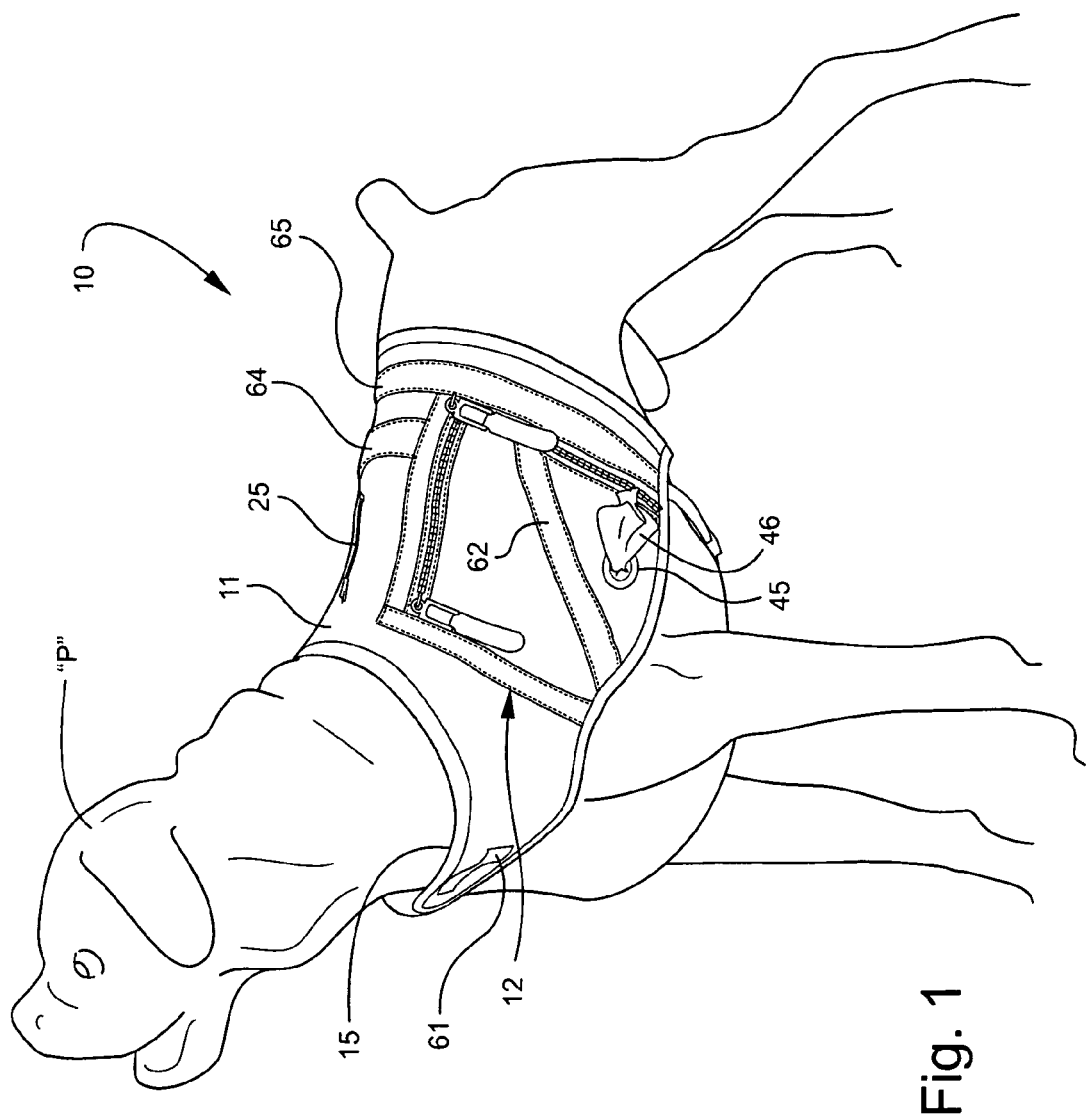
FIG. 1 is an environmental view of a pet utility vest according to one exemplary embodiment of the present disclosure.
Figure 2:
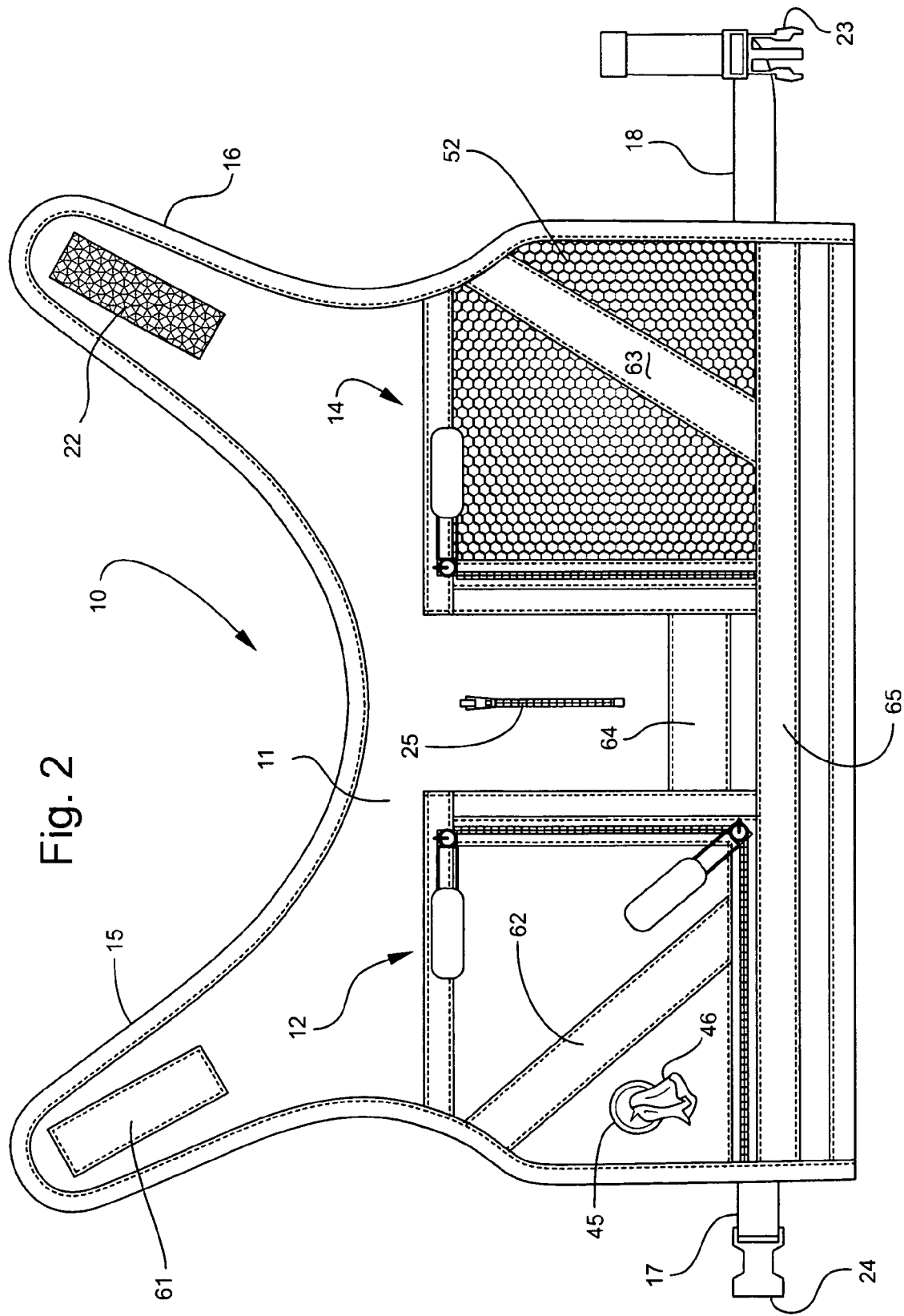
FIG. 2 is an outside view of the pet utility vest laid flat.
Figure 3:
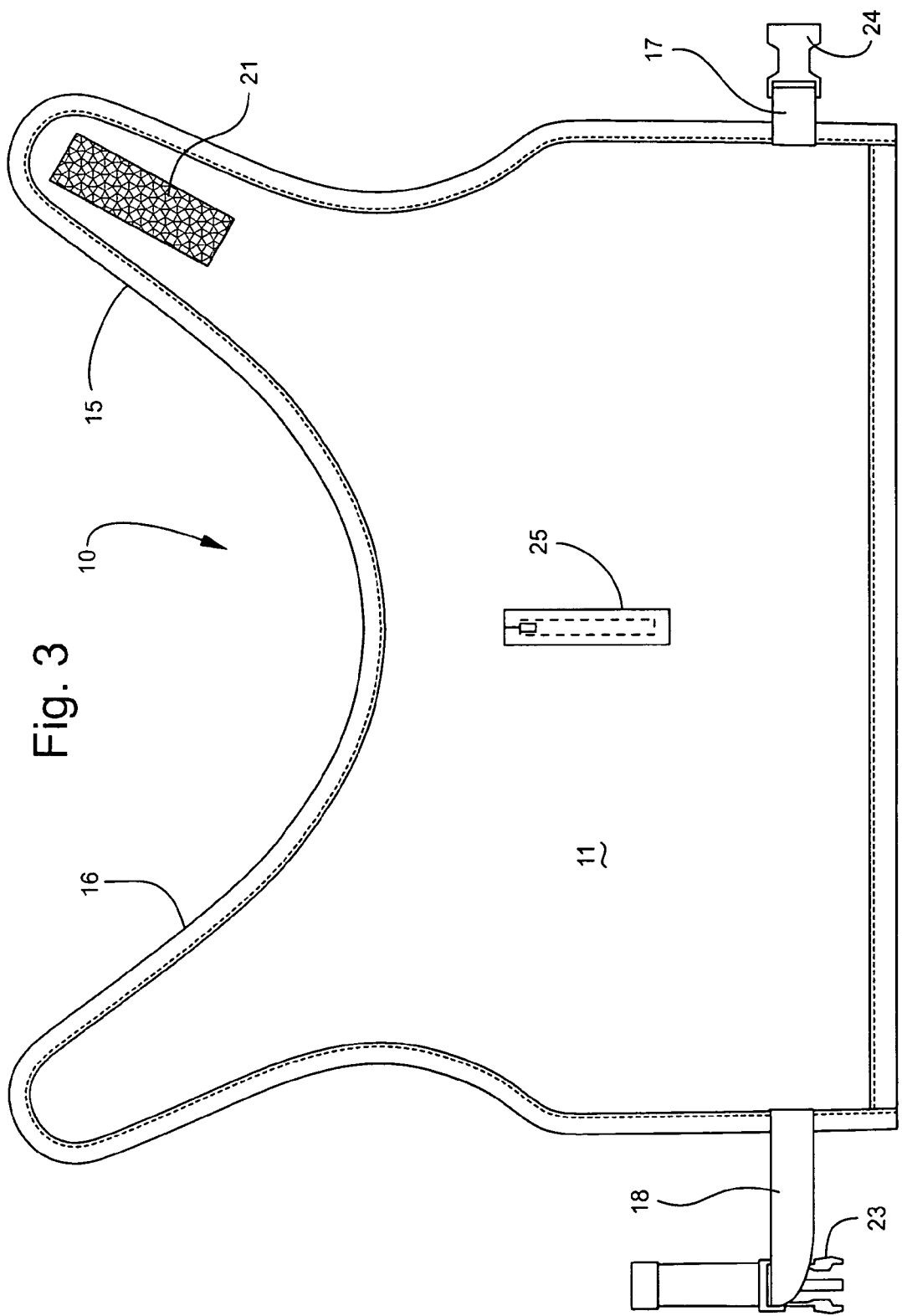
FIG. 3 is an inside view of the pet utility vest laid flat.
Figure 4:
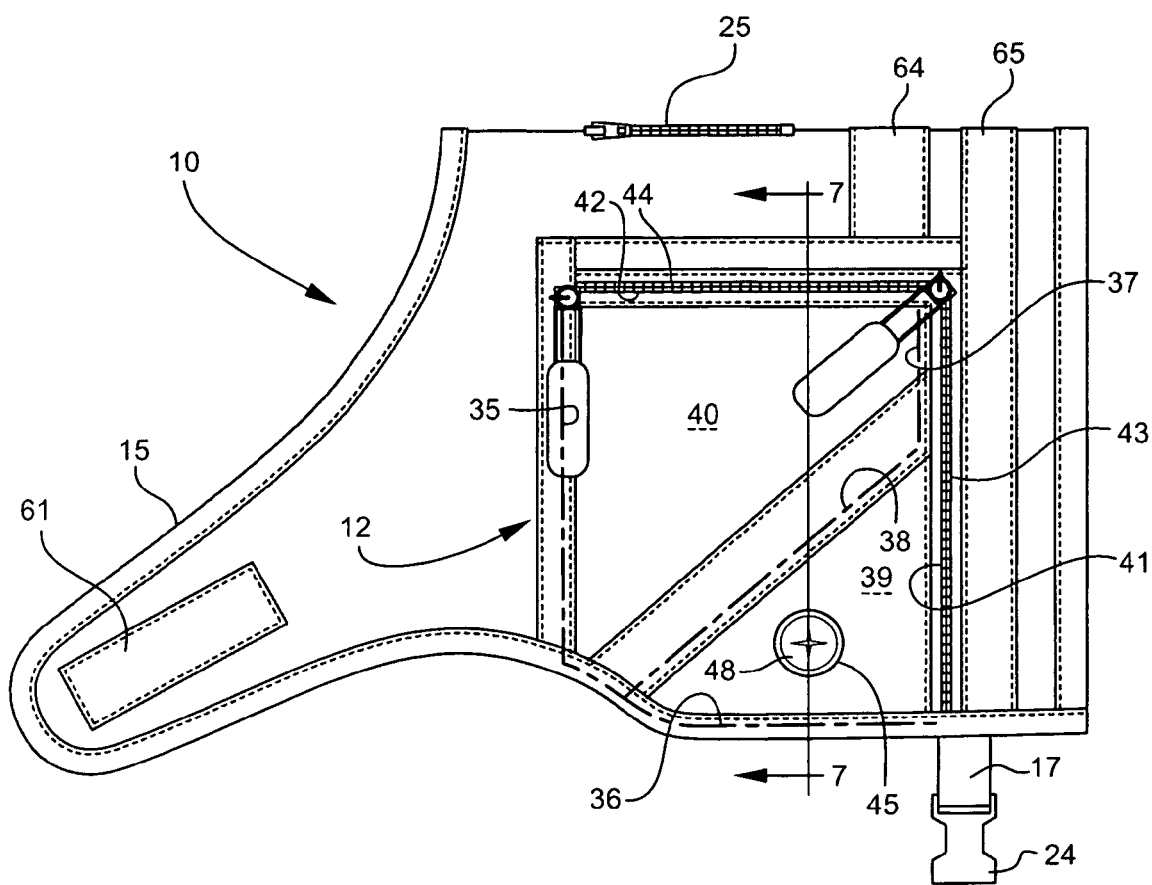
FIG. 4 is a first side elevational view of the pet utility vest.

Referring now specifically to the drawings, a multi-purpose pet utility vest according to one exemplary embodiment of the present disclosure is illustrated in FIG. 1, and shown generally at reference numeral 10. The pet utility vest 10 comprises a body portion, such as one-piece fabric body covering 11, and a pair of zippered pocket assemblies 12 and 14 (FIG. 2) carried by the body covering 11. As best shown in FIGS. 1, 2 and 3, the exemplary body covering 11 has elongated integrally-formed fabric neck straps 15 and 16, and first and second separately attached adjustable torso straps 17 and 18. The neck straps 15, 16 are relatively wide and have complementary patches 21, 22 of hook and loop fasteners, shown in FIGS. 2 and 3, designed to removably secure and fit the utility vest 10 around a neck of the pet "P". The torso straps 17, 18 are relatively narrow, and have complementary male and female fittings 23, 24 which mate to adjustably attach the utility vest 10 around a torso of the pet "P". The pairs of neck and torso straps 15, 16 and 17, 18, respectively, cooperate to custom-fit the utility vest 10 to the pet "P", as shown in FIG. 1. Additionally, the body covering 11 may comprise a zippered central access 25 for allowing attachment of harness-style leads to a harness (not shown) worn beneath the utility vest 10. For cold weather usage, the body covering 11 may be constructed of a thin water-repellant outside shell with a relatively thick quilted inner lining. A warm weather design may comprise one or more layers of durable, lightweight, breathable, water-repellant fabric.

Figure 6:
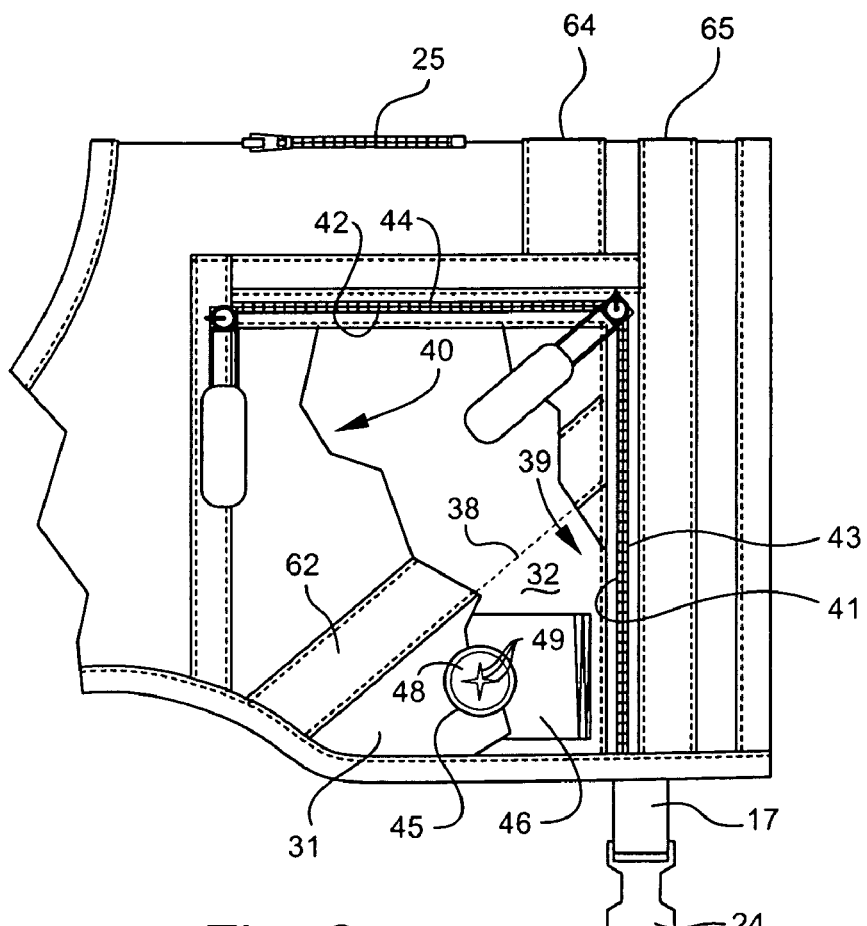
FIG. 6 is a fragmentary view of the pet utility vest with a portion of the first pocket assembly broken away.
Figure 7:
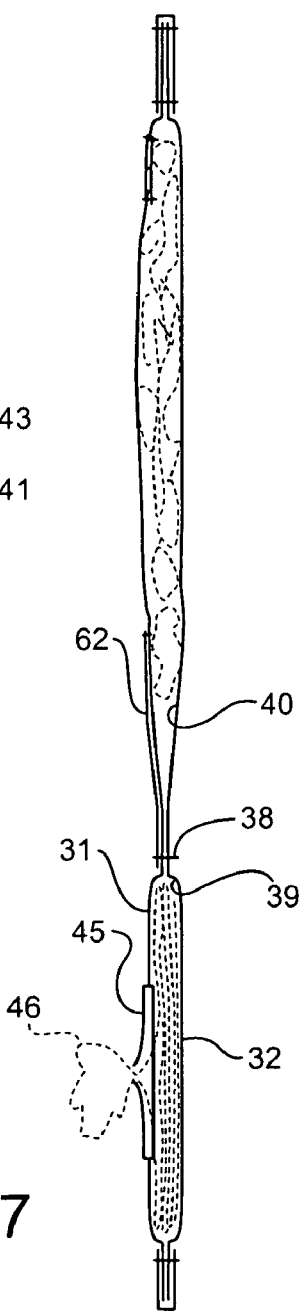
FIG. 7 is a cross-sectional view of the pet utility vest taken substantially along line 7-7 of FIG. 4.

Referring to FIGS. 1, 2, 4, 6, and 7, the first pocket assembly 12 is formed with the fabric body covering 11, and comprises overlying outside and inside pocket layers 31, 32. The pocket layers 31, 32 are joined together along peripheral edges indicated at dashed lines 35, 36, and 37 in FIG. 4, and along a diagonal stitch line indicated at dashed line 38. The diagonal stitch line 38 divides the pocket assembly 12 into first and second isolated utility compartments 39, 40 formed between the overlying pocket layers 31, 32. Each compartment 39, 40 has an access opening 41, 42 with a zipper closure 43, 44 for receiving and storing articles. In the exemplary embodiment, a rubber bag-dispensing grommet 45 is attached to the outside pocket layer 32, and forms a small hole which communicates with the first utility compartment 39 for dispensing disposable plastic waste bags 46 stored in roll-form inside this compartment. As best shown in FIG. 6, the exemplary rubber grommet 45 has a radially-slit flexible center 48 which defines pliant, generally wedge-shaped fingers 49 designed to frictionally engage the plastic bags 46 as they are pulled through the grommet 45 from inside the first utility compartment 39. The zippered access 41 to the first compartment 39 extends substantially perpendicular to the zippered access 42 to the second compartment 40. In one exemplary implementation, the disposable waste bags 46 may be dispensed from the first compartment 39 of the pocket assembly 12, and used to collect solid pet waste which may then be temporarily stored inside the isolated second compartment 40 of the pocket assembly 12. Alternatively, the second compartment 40 may be used for holding other loose articles, such as wet wipes, house keys, personal identification, and the like.

Figure 5:
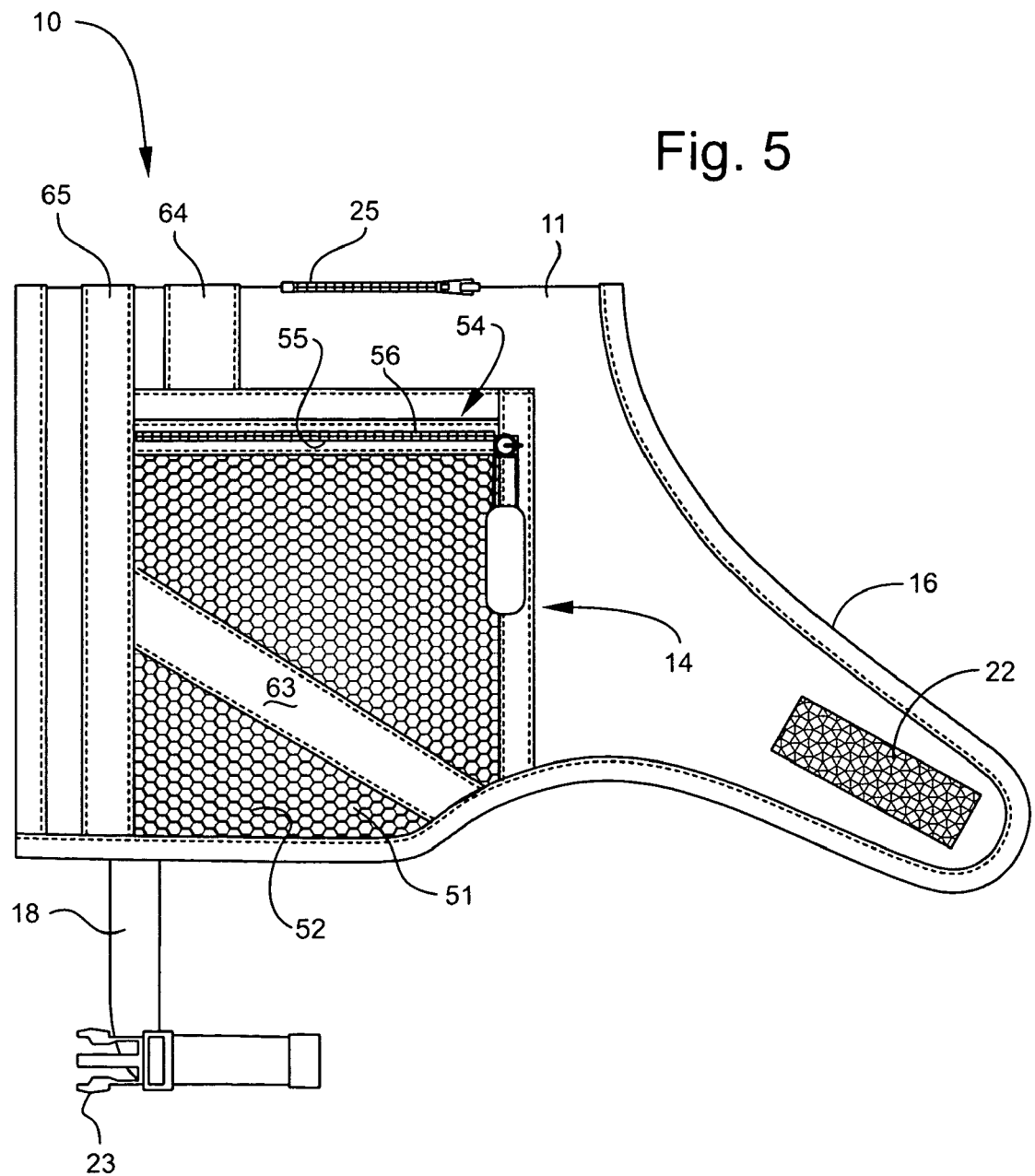
FIG. 5 is a second side elevational view of the pet utility vest.

Like pocket assembly 12, the second pocket assembly 14 (shown in FIGS. 2 and 5) is formed with the fabric body covering 11, and comprises overlying inside and outside pocket layers 51, 52. The pocket layers 51, 52 are joined together along their respective bottom and side edges, and define a relatively large third utility compartment 54 for receiving and storing loose articles. The top of pocket assembly 14 defines an access opening 55 with a zippered closure 56. In the embodiment shown, the outside pocket layer 52 is constructed of a see-through mesh fabric such that contents stored in the third compartment 54 are readily viewable. Used plastic bags or various other personal items may also be temporarily stored inside this compartment.

As best shown in FIG. 2, for safety purposes the pet utility vest 10 may also comprise a number of wide reflective strips 61, 62, 63, 64, and 65 applied to the fabric body covering 11 at strategic locations including, for example, the neck strap, diagonally at the pocket assemblies, between the pocket assemblies, and along a rear edge. The reflective strips 61-65 are designed and located to improve visibility (or conspicuousness) of the pet "P" in both daylight and dark conditions.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

We claim:

1. A multi-purpose utility vest for a pet, comprising:
   a body portion;
   a pocket assembly carried by said body portion and comprising overlying outside and inside pocket layers;
   said outside and inside pocket layers being joined together along a diagonal dividing line, a first side edge, a bottom edge, and a second side edge to define first and second isolated utility compartments, wherein the first utility compartment is defined by the first side edge, bottom edge, second side edge, and a top edge, and the second utility compartment is defined by the second side edge, the bottom edge, and the diagonal dividing line, the top edge of the joined pocket layers and at least a portion of the second side edge defining respective first and second access openings to said respective first and second utility compartments for receiving and storing articles therein, and said first and second access openings extending generally perpendicular to one another; and
   a bag-dispensing grommet attached to said outside pocket layer and defining a small hole communicating with said first utility compartment for dispensing disposable plastic bags stored in said first utility compartment.

2. A multi-purpose pet utility vest according to claim 1, wherein said bag-dispensing grommet comprises a radially-slit flexible center defining pliant fingers adapted to frictionally engage plastic bags pulled through said grommet from inside said first utility compartment.

3. A multi-purpose pet utility vest according to claim 1, and comprising means for selectively closing the access opening to said first utility compartment.

4. A multi-purpose pet utility vest according to claim 3, wherein said means for closing comprises a zipper fastener.

5. A multi-purpose pet utility vest according to claim 1, and comprising means for selectively closing the access opening to said second utility compartment.

6. A multi-purpose pet utility vest according to claim 5, wherein said means for closing comprises a zipper fastener.

7. A multi-purpose pet utility vest according to claim 1, wherein said body portion comprises a one-piece fabric covering.

8. A multi-purpose pet utility vest according to claim 7, wherein said fabric covering defines a zippered leash passage.

9. A multi-purpose pet utility vest according to claim 1, and including a second pocket assembly carried by said body portion, and comprising overlying outside and inside pocket layers defining a third utility compartment therebetween, and an access opening to said third utility compartment for storing articles therein.

10. A multi-purpose pet utility vest according to claim 9, wherein the outside pocket layer of said second pocket assembly comprises a mesh see-through fabric.

11. A multi-purpose pet utility vest according to claim 9, and comprising means for selectively closing the access opening to said third utility compartment.

12. A multi-purpose pet utility vest according to claim 11, wherein said means for closing comprises a zipper fastener.

13. A multi-purpose pet utility vest according to claim 1, and comprising a plurality of reflective strips applied to said body portion.

14. A multi-purpose pet utility vest according to claim 1, and comprising first and second adjustable torso straps adapted for detachably securing said body portion to the pet.

15. A multi-purpose pet utility vest according to claim 14, wherein said torso straps comprise complementary male and female fittings.

16. A multi-purpose pet utility vest according to claim 1, wherein said body portion comprises cooperating neck straps adapted for securing the vest around a neck of the pet.

17. A multi-purpose pet utility vest according to claim 16, wherein said neck straps comprise complementary hook and loop fasteners.

18. A multi-purpose pet utility vest according to claim 1, and comprising a plurality of detachably-connected plastic bags stored in roll-form in said first utility compartment.

19. A multi-purpose pet utility vest according to claim 1, further comprising a reflective diagonal strip applied to said outside pocket layer and extending along the diagonal dividing line to visually identify and distinguish said first and second utility compartments.

* * * * *